J. E. & C. E. HOWARD.
Machine for Cutting Ovals.
No. 167,534. Patented Sept. 7, 1875.
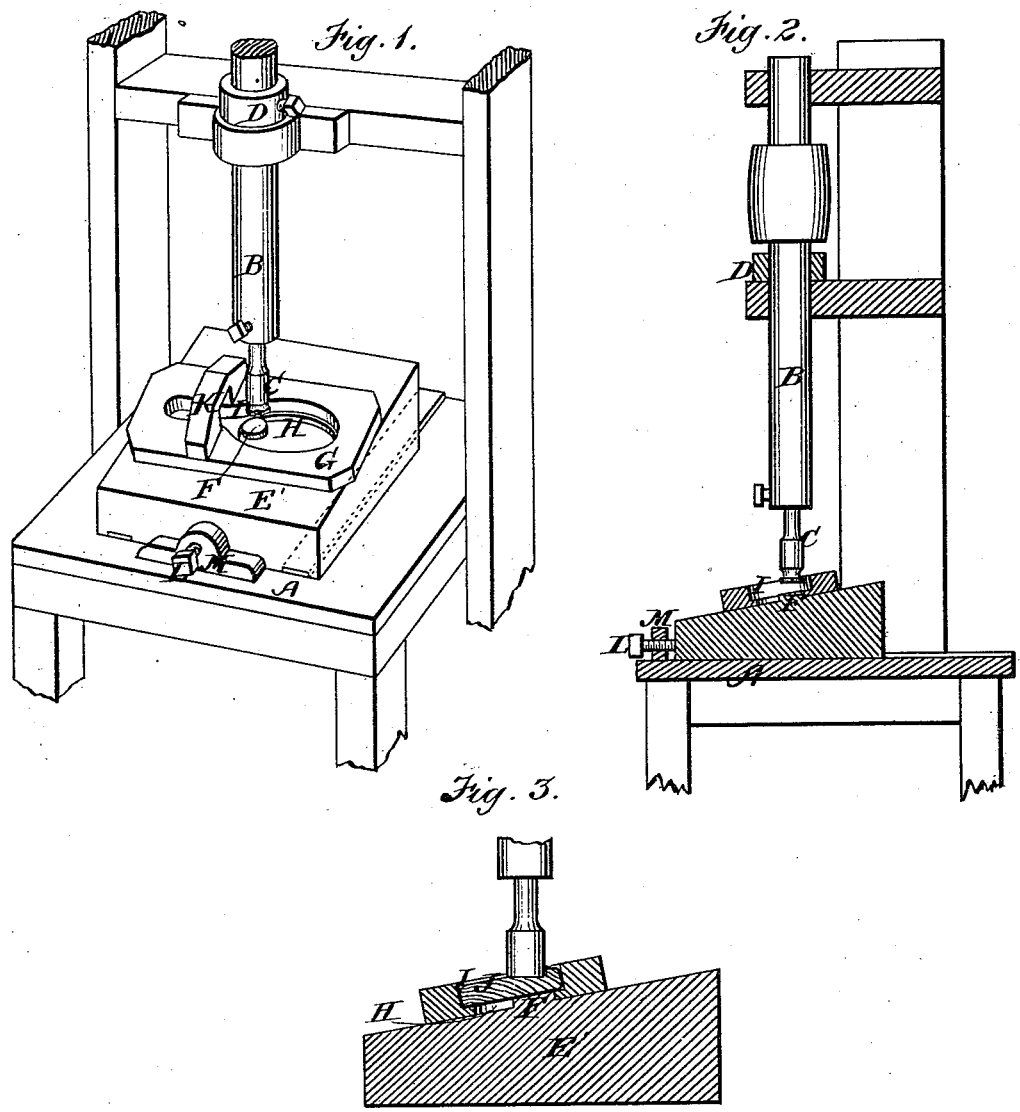
Witnesses.
John S. Folsom
James Barrett
Inventors.
J. E. Howard
C. E. Howard.
by their Attys
Carroll D. Wright & Brown

UNITED STATES PATENT OFFICE.

JOHN E. HOWARD AND CLARENCE E. HOWARD, OF READING, MASS.

IMPROVEMENT IN MACHINES FOR CUTTING OVALS.

Specification forming part of Letters Patent No. 167,534, dated September 7, 1875; application filed December 30, 1874.

*To all whom it may concern:*

Be it known that we, JOHN E. HOWARD and CLARENCE E. HOWARD, of Reading, in the county of Middlesex and State of Massachusetts, have invented certain Improvements in Machines for Cutting Ovals, of which the following is a specification:

Figure 1 is a perspective view of my improved machine. Fig. 2 is a vertical section of the same. Fig. 3 is a section showing the blank in place in the holder; and Figs. 4 and 5, sections showing the product of the machine.

Our invention has for its object to provide a machine for forming or sinking an oval recess in a wooden or other like surface, said recess having a bottom convex longitudinally and transversely, and also for forming a groove around and projecting into the interior of the lip or flange forming the margin of the oval recess, as in certain kinds of hair-brush and hand-mirror backs, the recess being intended for the reception of the glass or the backing of the brush material, while the groove receives and confines the edges of the glass or brush backing.

To this end my invention consists in the combination, with an overhanging rotary cutter on a vertical spindle, of a combined blank holder and guide, and an adjustable carriage adapted to present the stock to the cutter in such manner as to enable the latter to form the oval recess and groove above mentioned, as I will now proceed to describe.

In the drawings, A represents a frame or table, above which are the bearings of the vertical spindle or arbor B, in the lower end of which is located a cutter, C, which overhangs the table A at any desired height above it. The spindle B is adjustable vertically by means of a collar, D, surrounding said spindle and resting on one of the bearing-blocks, the collar being adjustable and engaged with the spindle by a set-screw, E. E' is a carriage adapted to slide horizontally upon suitable guides on the surface of the table A. The upper side of the carriage E' is beveled or inclined upward from front to rear, as shown, and this inclined surface is provided with a central circular boss or projection, F. The carriage is movable only from the front to the back of the table A, its movement being in such a line as to keep the central boss or projection F always in the same relation laterally to the cutter, so that the adjustment of the carriage changes the position of the boss with relation to the cutter only in the direction of the line of movement of the boss, and not at all in a direction at right angles with the line of its movement, said line being directly under the cutter from the front to the back of the table A. G represents the combined guide and blank-holder, which is preferably in the form of a rectangular frame of such size as to be readily manipulated by the hands of the operator. It is provided on the lower side with an oval or other shaped recess or guide, H, which, when in operation, incloses the boss F, the holder G resting on the inclined surface of the carriage E', as shown in Fig. 1. The upper side of the holder is provided with a recess, I, of such form as to receive and hold the blank J while being worked, the latter being confined by any suitable means, preferably by a wedge driven into a recess in a bridge, K, on the upper side of the holder. L is a set-screw located in an ear or lug, M, projecting upward from the table A at the front thereof. The inner end of the screw L bears against the front of the carriage E', and serves to limit the movement of the carriage toward the front of the table.

The operation of our invention is as follows: The blank being inserted in the holder G, the carriage E' is pushed back from under the cutter and the holder placed on the inclined surface, with the oval guide H over and inclosing the circular boss F, which serves as the pivotal or central point, around which the holder G travels in a path governed and shaped by the guide H. The carriage is then moved back so as to bring the blank into the proper position under the cutter, this position being regulated by the set-screw L, which stops the carriage with its boss F immediately under the cutter or at a point at one side of the latter, longitudinally of the line of motion of the carriage.

The operator stands at the front of the table, and grasping the holder G, propels it in its oval path around the boss F, the overhanging cutter operating upon the upper surface of the blank, and forming or sinking a recess thereon corresponding in shape to the guide H, its size being governed by the position of the boss with relation to the cutter, the figure cut being largest when the boss is directly under the cutter, and decreasing as the boss is moved away. The operator directs the holder so as to cause the cutter to operate on the upper side of the inclined blank or the side toward the back of the table, the guide H being held at all times against the back part of the boss F; consequently, when the boss is moved away from the cutter, it increases the distance between the edge of the blank and the cutter, and vice versa, there by reducing or increasing the size of the figure or recess cut in the blank.

In the practical use of the machine we have used two cutters, one adapted to cut at the bottom and the other laterally, the former being employed in making the oval recess in the blank, and the latter for cutting the groove around said recess.

In making hair-brush backs adapted to receive an elastic or flexible backing holding the bristles or brush material, it is necessary to form an oval or other equivalently-shaped recess, with a bottom convex in both directions, longitudinally and transversely, so as to cause the bristles to radiate, the backing being laid upon the convex bottom. This convexity is produced by the inclination of the upper surface of the carriage E', which presents the blank in an inclined position to the cutters, and causes the first cutter to form a recess gradually increasing in depth from the center outwardly to the margin in all directions, as shown in Figs. 4 and 5, the bevel being the same as that of the carriage, hence, by employing two carriages differently beveled, a double bevel may be formed on the bottom of the recess, as shown in Figs. 4 and 5, thereby reducing said bottom nearly to a convex shape, the same needing only a slight dressing by hand to complete it.

As before mentioned, the first cutter forms an oval recess corresponding to the outline of the guide H, said recess being bounded by a wall or flange, into which it is necessary to cut a groove for the reception of the edges of the brush-backing. To this end I remove the first cutter and substitute another adapted to produce the desired result, at the same time moving the carriage inwardly so as to allow the second cutter to project and cut into the wall or verge of the recess already formed. The holder is then carried around as before, and the groove $g$ formed as shown in Fig. 5, thereby completing the operation.

We do not claim the devices shown in the patents to M. T. Boult, dated March 15, 1870, No. 100,848, and July 4, 1871, No. 116,543, for carving-machines, nor those shown in the patent to John Kimball, dated November 15, 1859, No. 26,113, for molding-machines; but What we do claim as our invention is—

1. The combination of the sliding carriage E', having an inclined upper surface, provided with the boss or projection F, the blank-holder and guide G H, and an overhanging cutter, C, all arranged and operating substantially as described.

2. The combination of the carriage E' and blank-holder G with the adjustable screw L and cutter C, substantially as and for the purpose set forth.

In testimony whereof we have signed our names to this specification in the presence of two subscribing witnesses.

JOHN E. HOWARD.
CLARENCE E. HOWARD.

Witnesses:
C. F. BROWN,
JOHN S. FOLSOM.